(12) United States Patent
Christeson

(10) Patent No.: US 7,157,001 B2
(45) Date of Patent: Jan. 2, 2007

(54) CARBON FILTRATION PROCESS AND APPARATUS FOR REMOVING PCB'S AND OTHER COMPOUNDS FROM WASTEWATER

(75) Inventor: Curt A. Christeson, Rochester Hills, MI (US)

(73) Assignee: Hubbell, Roth & Clark, Bloomfield Hills, MI (US)

( * ) Notice: Subject to any disclaimer, the term of this patent is extended or adjusted under 35 U.S.C. 154(b) by 0 days.

(21) Appl. No.: 11/045,840

(22) Filed: Jan. 28, 2005

(65) Prior Publication Data

US 2006/0108284 A1    May 25, 2006

Related U.S. Application Data

(60) Provisional application No. 60/631,051, filed on Nov. 24, 2004.

(51) Int. Cl.
*C02F 3/00*    (2006.01)
(52) U.S. Cl. .............. 210/617; 210/694; 210/670; 210/678; 210/748; 210/265; 210/275
(58) Field of Classification Search ............... 210/617, 210/694, 670, 678, 748, 265, 275
See application file for complete search history.

(56) References Cited

U.S. PATENT DOCUMENTS

| 4,172,781 A | * | 10/1979 | Walk et al. ............ 210/626 |
| 4,292,176 A | * | 9/1981 | Grutsch et al. ........... 210/616 |
| 4,568,463 A | * | 2/1986 | Klein .................... 210/607 |
| 5,298,172 A | * | 3/1994 | Smith .................... 210/747 |
| 6,503,404 B1 | | 1/2003 | Ghalib |
| 6,921,489 B1 | * | 7/2005 | Albertson ............... 210/802 |

OTHER PUBLICATIONS

United States Environmental Protection Agency, *Wastewater Technology Fact Sheet*, Sep. 2000, EPA 832-F-00-017.

* cited by examiner

*Primary Examiner*—Chester T. Barry
(74) *Attorney, Agent, or Firm*—Brooks Kushman P.C.

(57) ABSTRACT

Process and apparatus for treating wastewater from a sewer system including the steps of: (A) removing solids contained in the influent to create solids-depleted preliminary effluent (PrE) and to protect downstream systems from premature failure due to wear from solid particles; (B) removing suspended solids from the PrE to produce a suspended solids-depleted primary effluent (PE); (C) treating the PE biologically by exposing it to bacteria-supporting media that removes soluble organic material, thereby creating trickling filter effluent (TFE); (D) separating the bacterial organisms by settling to create a secondary effluent (SE); (E) subjecting the SE to tertiary treatment including granular activated carbon pressure filters to remove PCB's and other compounds and create a carbon filter effluent; (F) disinfecting the CFE to create a final effluent (FE); and (G) discharging the FE to a receiving environment, separately settling and disposing the backwash solids in a backwash clarifier.

28 Claims, 2 Drawing Sheets

CARBON FILTRATION PROCESS AND APPARATUS FOR REMOVING PCB'S AND OTHER COMPOUNDS FROM WASTEWATER

CROSS-REFERENCE TO RELATED APPLICATION

This new utility application claims the benefit of provisional application Ser. No. 60/631,051, filed on Nov. 24, 2004.

BACKGROUND OF THE INVENTION

1. Field of the Invention

The invention relates to the process and construction of wastewater treatment plants. More specifically, the invention relates to a system for removing contaminants from wastewater.

2. Background Art

Municipalities are often faced with the challenge of removing polychlorinated biphenyl (PCB) and other organic compounds from the discharge of their aging wastewater treatment facilities. Polychlorinated biphenyl is a man-made compound that was used in the manufacture of transformers, hydraulic oils, paints, and in other products. It has been determined to be a health risk to humans and is seen as a bio-accumulative chemical of concern. The PCB, which may be found in the plant's influent and sometimes in the effluent, must be removed to meet a limitation on amounts that are less than can be detected. New facilities may be required to provide the best available treatment for PCB's.

Past manufacturing and disposal procedures have caused the dispersal of PCB in various areas. One of the properties of PCB which made it an attractive product was its resistance to environmental breakdown. Medical research discovered that small concentrations of PCB could cause birth defects and consequently, the manufacture of PCB has been prohibited.

A municipal sewer system may be a combined sewer system subject to periodic flooding. This may spread PCB contamination throughout the sewer system. With PCB's affinity to solids, PCB may be adhered to the sewer walls and solids within the sewer system, and the PCB will periodically be released into the sewage for many years to come.

However, this environmental persistence of PCB prompted the EPA to regulate its discharge from wastewater treatment plants. Because PCB is potentially harmful even at low concentrations, the EPA has set the discharge limitation for PCB at 0.02 parts per trillion, which is 5000 times lower than concentrations (0.1 parts per billion) which current laboratory technology can detect.

It is known that PCB has a large molecular weight and that it is not readily soluble in water. However, it is highly adsorbed by activated carbon. Activated carbon is a granular charcoal that is made by the process of grinding and burning bituminous coal. The size of a carbon grain is about the size of sand (about 0.8 to 1.0 mm in diameter). When water passes through a filter bed of granular activated carbon, the carbon removes dissolved organic contaminants from water by adsorption. During the adsorption process, organic molecules diffuse into the pores of the carbon granules and physically or chemically attach to the carbon. But eventually, a carbon bed becomes saturated with PCB or the concentration exceeds an acceptable limit. At that time, the carbon must be replaced or an alternative solution is needed.

Several authorities have voiced concerns regarding the combined effects of bio-growth and oil accumulation at treatment plants that lack sand pre-filtration facilities.

SUMMARY OF THE INVENTION

In an effort to bring a plant into compliance, pilot studies have been conducted to evaluate PCB removal alternatives. One pilot testing program determined the concentration of PCB in all of the liquid and solid process flow streams and recirculation streams in a plant.

For a PCB Mass Balance Study, 300 samples were analyzed for PCB. The results of the study indicated that the PCB detected in the system was found in the various solids streams in the facility. However, since no specific treatment system existed at the plant to remove PCB, governmental authorities required that: (1) the facility install the best available technology for PCB removal; (2) the treatment be incorporated in the final effluent where PCB concentrations are the least; and (3) the maximum benefit could made for the environment.

The second phase of the PCB studies was to evaluate the best effluent treatment method. One method for removing PCB is to use granular activated carbon. The pilot testing system consisted of two pressure filters in series: a sand prefilter followed by a granular activated carbon filter. The sand filter was used to remove suspended solids which were present in a plant's final effluent, to allow the carbon filter to work more efficiently. The study proved that PCB could be efficiently removed from the final effluent using granular activated carbon.

As a result of the PCB pilot test, it was determined that prefiltration before the granular activated carbon treatment provided minimal process benefits. An additional pilot study was conducted to test carbon filtration without sand prefiltration. The second study evaluated two granular carbon filtration beds which could be operated in parallel or in series.

The second pilot study was a success, with no PCB being measured in the effluent from the carbon filter. The testing also determined that under final full scale operation, the carbon filters would filter the suspended solids remaining in the secondary clarifier effluent, and that the filters would require backwashing approximately once per day. The design information achieved during the pilot study helped optimize the final project design.

By not having to construct a sand prefiltering system prior to the activated carbon system, one municipality saved an estimated $5 million in capital expenditures.

The invention thus provides state of the art treatment for PCB. Direct carbon filtration of secondary effluent has proven to be cost-effective, providing an innovative treatment method that has saved millions of dollars in capital expenditures. This unique treatment system has improved the water environment which will help provide future redevelopment of a city that can be focused around both tourism and manufacturing.

DETAILED DESCRIPTION OF THE PREFERRED EMBODIMENTS

Figure 1:
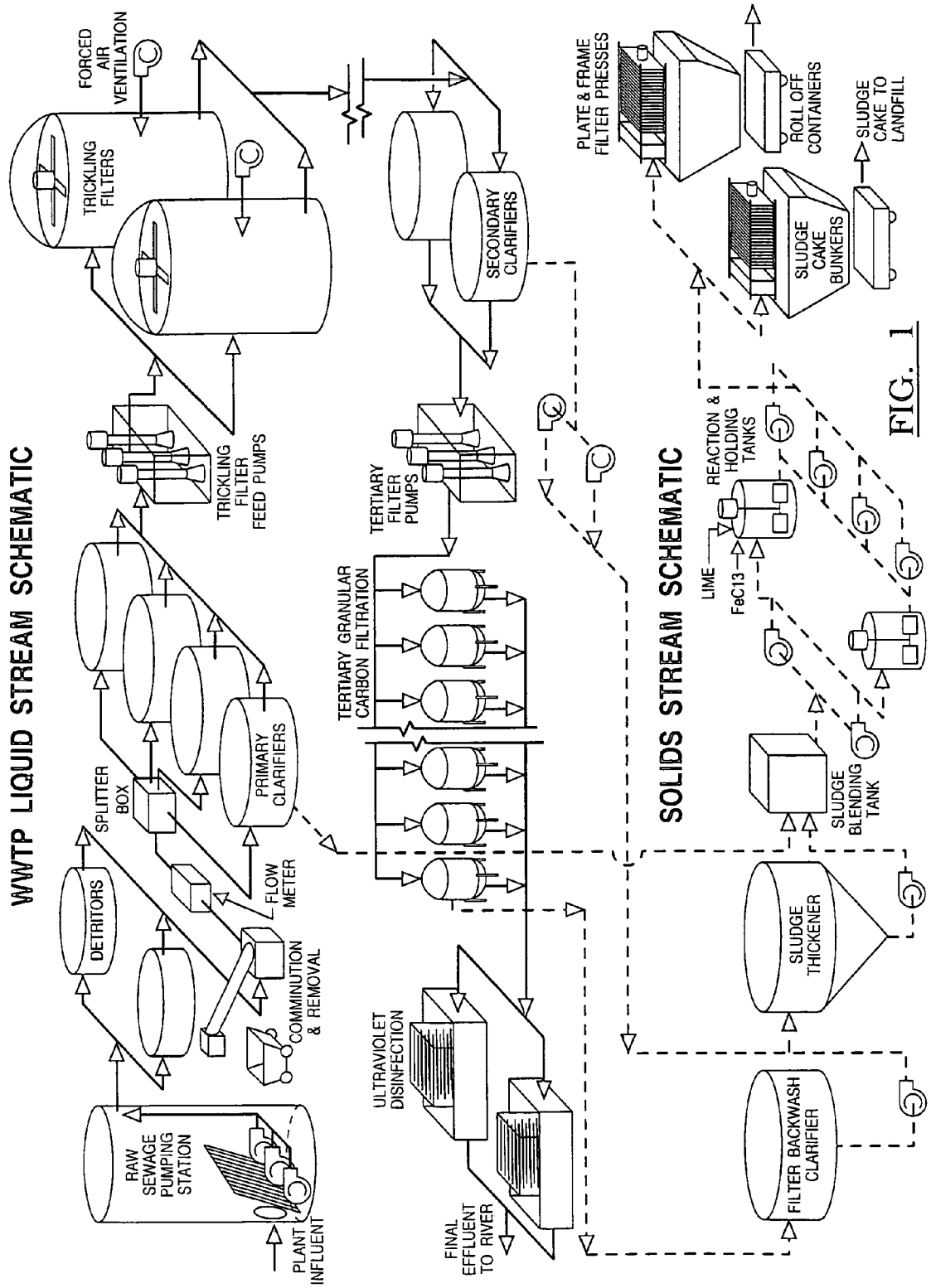
FIG. 1 is a schematic drawing of streaming liquids and solids through a wastewater treatment plant (WWTP)
Figure 2:
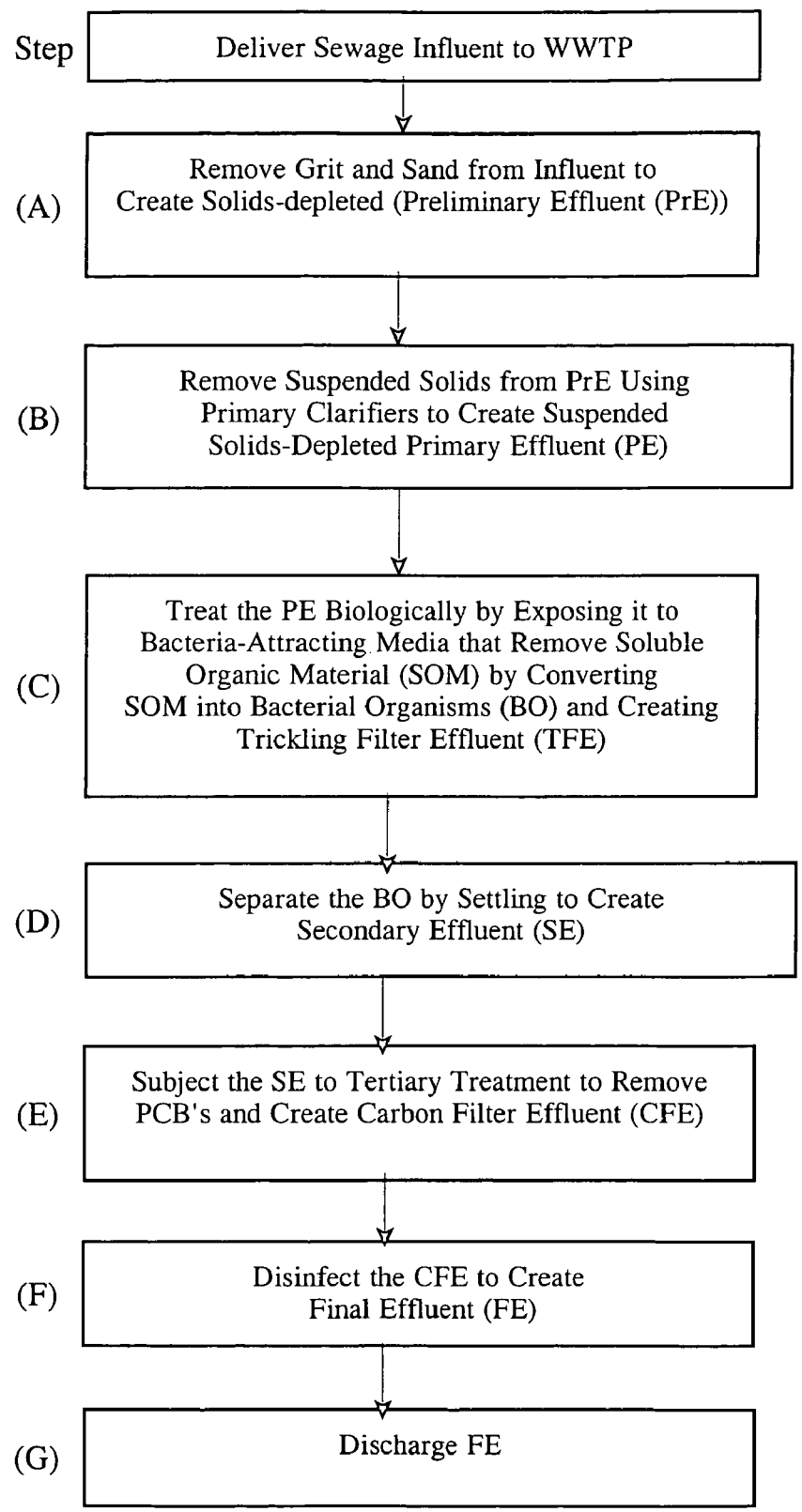
FIG. 2 is a block flow diagram of several steps in the inventive process.

Referring now to FIGS. 1–2, sanitary sewage (influent) is transported to a wastewater treatment plant (WWTP) through a series of sewers, pumping stations, and interceptors to a raw sewage pumping station, located at the WWTP. In one embodiment of the invention, the raw sewage pumping station contains five pumps which lift the wastewater from deep in the sewer system up into the treatment plant where various unit processes are located to purify the wastewater.

The first step (step A) in the treatment process involves removal of solids such as the sand and grit contained in the wastewater to create solids-depleted wastewater known as Preliminary Effluent (PrE) and thus protect downstream treatment plant systems from premature failure due to wear from the sand and grit. The solids are removed in tanks called detritors, where the sand and grit is allowed to settle out of the waste stream. Following sand and grit removal, the PrE continues to flow by gravity or pumping to one or more primary clarifiers in Step B. In one case, the primary clarifiers hold the wastewater for approximately one to two hours, to allow further the settling and removal of suspended solids in the wastewater stream. This creates a suspended solids depleted wastewater known as Primary Effluent (PE).

Now the wastewater stream is mostly free of suspended solid material, but still contains soluble organic material, which must be removed before the final wastewater stream can be released back into the environment. The next step (step C) in the treatment process is called biological treatment. Following settling in the primary clarifiers, the wastewater is again pumped into one or more tall tanks called trickling filters. In one example, the trickling filters contain large, 3' cubes of plastic media with openings for water to pass through, where the wastewater is allowed to flow or trickle down a serpentine path through the tank. As the wastewater flows over the plastic media, bacteria attach to the media and remove the soluble organic material (SOM) from the wastewater as food. The bacteria reproduce, and as the wastewater passes through the media, some of the bacteria are sloughed off and are removed from the trickling filter as suspended particles. Therefore, the biological treatment step of the wastewater treatment process includes converting the soluble organic material into bacterial organisms (BO). The effluent from this step is known as Trickling Filter Effluent (TFE).

Following biological treatment, the TFE continues to flow by gravity or pumping from the trickling filters to one or more secondary clarifiers. Once again the wastewater is retained quiescently (step D) for, in one case, for a period of approximately two to four hours in large settling tanks. The suspended bacteria produced in the trickling filters are allowed to settle to the bottom of the secondary clarifiers producing what is known as secondary effluent (SE).

If PCB's or other organic compounds are to be removed, the secondary effluent (SE) now enters the final treatment step (step E) before being discharged back into the environment. This treatment step is called tertiary treatment. It is required in wastewater effluents which PCB or other organic compounds are to be removed. The specific tertiary treatment creates a carbon filter effluent (CFE) by a process that is described in more detail in a subsequent section of this description. Following tertiary treatment, all wastewaters are disinfected (step F) before discharge (step G) to the receiving waters. In one example, the disinfection system involves passing the wastewater through channels where it is exposed to ultraviolet light, which alters the reproductive capacity of pathogenic organisms which may be present in the wastewater stream. By altering the reproductive ability of the organisms in the wastewater, they can no longer be harmful and cause disease. In one case, the actual ultraviolet disinfection process involves passing the wastewater for only seconds through two channels containing often times hundreds of ultraviolet-producing lamps which irradiate the wastewater, thus disinfecting the wastewater stream as the wastewater passes through the channel.

Solids removed from the wastewater treatment process are separately collected and removed. Light organic solids removed from the secondary clarifiers flow through a sludge thickener, where they are allowed to settle further and thicken. For example, their solids content may be increased from approximately 1% solids to approximately 4% solids. The solids removed from the primary clarifiers, which may be approximately 5% solids, are blended with the secondary solids. If desired, chemicals may be added to help further dewater the solids to decrease the volume for ultimate disposal. For example, lime and ferric chloride are mixed with the solids, and the solids stream is pumped in batches to plate and frame filter presses. These presses include of a series of recessed plates with a filter cloth that retains the solids, but the liquid is allowed to drain from the solids as they are pumped into the unit at pressures up to 200 lbs/in$^2$. The solids are held in the filter presses from approximately two to four hours, where the solids content is increased from 5% to about 45% solids.

At that point, operations staff may discontinue pumping the solids stream to the filter presses. The presses may then be opened and the approximately 3'×3'×2" thick solids wafers are allowed to fall from the press into roll off containers. If desired, the roll off containers are transported daily to a local landfill, where the solids are mixed with other refuse for ultimate disposal.

An Example of a Tertiary Treatment System

Following the secondary clarifiers (step D), the secondary effluent (SE—FIG. 2) may still contain up to approximately 30 mg/L of suspended solids. That amount of suspended solids, while acceptable to meet national pollution discharge limitations developed by the EPA, may equate to (for one particular city) about 4,000 lbs/day of suspended solids being released to for example, a river. In the case of most WWTPs, a discharge of 30 mg/L of suspended solids does not pose a significant risk to the environment. However, in some cases of wastewater discharge, those suspended solids could contain polychlorinated biphenyl (PCB) or other organic compounds. With an effluent limitation of 0.02 parts per trillion (ppt), further treatment technology is needed to remove these residual solids. Sand filtration, followed by granular activated carbon filtration, was the prior art for the removal of organic material from wastewater. Under prior approaches, the sand filters removed suspended solids which could interfere with the carbon filter process needed to remove soluble organic compounds such as PCB.

The present invention involves removing both solids and soluble organic material such as PCB in one step, thus saving the capital required for the construction of sand filters.

Continuing with primary reference to FIG. 1, following secondary clarification, the wastewater flows to a wet well, where tertiary filter pumps move the secondary effluent to a number of (e.g. 20) of pressure filter vessels, each containing an amount (e.g. 20,000 pounds) of granular activated carbon.

It is known that granular activated carbon is an adsorbent of choice for removing toxic pollutants from water and that granular activated carbon is a highly porous adsorbent material. It is produced, for example, by heating organic matter such as coal, wood and coconut shell in the absence of air, and then crushed into granules. Activated carbon is positively charged and is therefore able to remove negative ions from wastewater and dissolved organic solutes by adsorption into the activated carbon. The activated carbon is replaced periodically after it becomes saturated and thus unable to capture undesirable solutes. In the context of the present invention, granular activated carbon is used for the advanced (tertiary) treatment of municipal and industrial wastewater. It effectively adsorbs relatively small quantities of soluble organics and inorganic compounds such as nitrogen, sulfides, and heavy metal remaining in the wastewater following biological or physical-chemical treatment. Adsorption occurs when molecules adhere to the internal walls of pores in carbon particles produced by thermal activation. Further details concerning granular activated carbon are found in such references as "WASTEWATER TECHNOLOGY FACT SHEET," EPA 832-F-00-017 (September 2000), which is incorporated herein by reference.

In one example, pressure filter vessels containing granular activated carbon were positioned so that the secondary effluent (SE) was ducted through a channel that had 20 emergent pipes. Each pipe communicated with two pressure filter vessels that were connected in series. It will be appreciated that other combinations of parallel and series configurations of pressure vessels that treat the secondary effluent (SE) are considered to be within the scope of the invention. The design alternatives thus enable the engineer to balance the flow capacity constraint of a particular installation with a desired level of purity in the resulting effluent.

In one example, an 8 by 30 mesh granular carbon was used; and each 10' diameter by 20' tall vessel had the capacity of one million gallons per day (GPD). A particular city had the capacity for 18 million GPD, thus allowing two pressure vessels to be maintained as backup units in the event that some vessels were removed from service for maintenance.

The wastewater is retained in the pressure filter vessels for a dwell time, e.g. approximately 7.5 minutes, which is a recommended retention time for optimal PCB removal.

In addition to removing PCB and other organic materials by the carbon, the residual suspended solids from the waste stream are decreased from approximately 30 mg/L to less than 2 mg/L suspended solids.

The solids, which are retained in the granular activated carbon, must be periodically backwashed using filter backwash pumps. The backwash step includes a scouring operation using compressed air followed by pumping filtered final effluent back through the bottom of the vessel, e.g. at 12 gpm/sf, thus lifting and mixing the carbon with water. The upward flow of water expands the carbon bed, thus detaching the suspended solids which have been retained by the carbon. The backwash flow takes place for a period, e.g. approximately ten minutes. This backwash stream containing high concentrations of suspended solids is diverted to another part of the process.

One system has been designed to allow the backwash flow to be diverted to a separate backwash clarifier. Provisions have been made to add a polymer and ferric chloride to this backwash flow prior to discharge to the backwash clarifier. Polymer and ferric chloride or their equivalents are used to agglomerate the suspended solids in the backwash into larger, more easily-settled solids, which can be separately removed in the backwash clarifier. Typically, plants which utilize tertiary filtration allow the backwashed solids to be directly recycled back into the wastewater treatment process without the backwash clarification step.

Due to the low levels of PCB which must be achieved, the system removes the backwashed solids without recycling them back to the treatment plant, thus not allowing the solids which may contain some PCB to be mixed back into the wastewater stream. The solids which settle from the backwash flow are removed from the backwash clarifier using sludge pumps to move the backwash solids to the existing sludge thickener before blending and further treatment and removal to a landfill as previously described.

The system periodically doses the carbon filters with sodium hypochlorite (bleach) or an equivalent to disinfect the filters and remove bacterial growth. This minimizes the risk that bacteria could attach and grow on the carbon filters since the wastewater stream provides a food source for residual bacteria still remaining in the wastewater stream (thus interfering with the process).

The system includes the provision of sodium hypochlorite tanks, feed pumps, and supply piping to dilute and distribute in one example, an approximate 5% sodium hypochlorite solution to the backwash headers of each of the 20 carbon pressure filter vessels.

Thus there has been disclosed a granular activated carbon process that successfully reduces or eliminates influent PCB concentrations consistently below a level of detection. The activated carbon filtration (tertiary treatment) process is cost-effective in that it is accomplished without sand filtration, and is environmentally and socially acceptable. No pre-filtration steps or facilities are required. In one occasion, the elimination of sand filtration enables cost savings of almost $5 million to be realized.

In one embodiment, the use of an activated carbon treatment without pre-filtration involved deploying 20 activated carbon treatment units, each sized for one MGD. Such units were capable of operating in series or in parallel. For flows up to 10 MGD, the system was operated in series. In that embodiment, the first carbon treatment served as a filter while also removing PCBs. The second unit acted as a polishing filter which further removed any PCBs that may have passed through the first unit. It was found that as flows increased over 10 MGD, individual units could be switched to a parallel mode until all units were operating in parallel (18 MGD).

Experiments have confirmed that the life expectancy of the carbon is extended by the prior removal of solids by filtration. But the increased efficiency and savings in carbon replacement costs were outweighed by the high capital costs for sand filters.

Although other forms of filters are available, a suitable carbon filtration system is available from Calgon of Pittsburgh, Pa. For example, its Model 10 (Dual Module Adsorber) has been found to be suitable for use in the disclosed process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for treating influent wastewater from a sewer system comprising the steps of:

(A) removing solids contained in the influent to create a solids-depleted preliminary effluent (PrE) and to protect downstream systems from premature failure due to wear from solid particles;
(B) removing suspended solids from the PrE to produce a suspended solids-depleted primary effluent (PE);
(C) treating the PE biologically by exposing it to bacteria-supporting media in a trickling filter that remove soluble organic material, thereby creating a trickling filter effluent (TFE);
(D) allowing suspended bacteria in the TFE to settle to create a secondary effluent (SE); and
(E) subjecting the SE to tertiary treatment including granular activated carbon pressure filters to remove PCB's and other compounds to create a carbon filter effluent (CFE),
so that sand filtration prior to step (E) can be avoided and solids plus soluble organic materials can be removed in one step.

2. The process of claim 1 further comprising the step (F) of disinfecting the wastewater after step (E) before a discharging step (G) to create a final effluent (FE).

3. The process of claim 2 further comprising the step (G) of discharging the FE to a receiving environment.

4. The process of claim 2 wherein the step (E) comprises subjecting the SE to temporary containment in a wet well from which one or more tertiary filter pumps move the SE to one or more pressure filter vessels, at least one of which containing granular activated carbon.

5. The process of claim 4 wherein the one or more pressure filter vessels are connected in series.

6. The process of claim 4 wherein the one or more pressure filter vessels are oriented in parallel.

7. The process of claim 4 wherein the one or more pressure filter vessels are oriented in series and in parallel.

8. The process of claim 4 wherein the one or more pressure filter vessels are oriented in parallel and in series.

9. The process of claim 4 wherein the one or more pressure filter vessels are oriented so that one group is connected in series with each other and another group is connected in parallel with the other members of that group.

10. The process of claim 1 wherein step (E) comprises subjecting the SE to a number of pressure vessels between 15 and 25.

11. The process of claim 10 further comprising the step of providing one or more of the pressure vessels with an amount of granular activated carbon in one vessel weighing between 15,000 and 25,000 pounds.

12. The process of claim 11 wherein the carbon filter effluent (CFE) is by volume up to one million gallons per day.

13. The process of claim 1 wherein step (E) further comprises providing a number of pressure filter vessels containing granular activated carbon such that a number of operational vessels is available for processing the secondary effluent while a remaining number of the vessels is maintained as back-up units in the event that one or more of the operational vessel is removed from service for maintenance.

14. The process of claim 13 wherein step (E) comprises retaining the secondary effluent in the pressure filter vessels for a dwell time between 5 and 10 minutes.

15. The process of claim 14 wherein the residual suspended solids are decreased from about 30 mg/L to less than 2 mg/L.

16. The process of claim 1 further comprising the step of backwashing solids that are retained by granular activated carbon used in the tertiary treatment step (E).

17. The process of claim 16 wherein the backwashing step includes a scouring operation using compressed air.

18. The process of claim 17 further comprising the step of pumping filtered final effluent (CFE) back through a bottom portion of one or more pressure filter vessels, thus lifting and mixing the carbon with the CFE, thereby expanding the carbon bed and detaching suspended solids that have been retained.

19. The process of claim 18 wherein the backwashing step lasts for between 5 and 15 minutes.

20. The process of claim 19 wherein a backwash stream containing suspended solids is diverted to a separate backwash clarifier.

21. The process of claim 20 further comprising the step of providing a polymer and ferric chloride to the backwash stream prior to discharge to the backwash clarifier to agglomerate the suspended solids in the backwash into larger, more easily-settled solids that can be separately removed in the backwash clarifier.

22. The process of claim 19 wherein backwashed solids are recycled back into the wastewater treatment process without a backwash clarification step.

23. The process of claim 20 wherein solids settling from a backwash flow are removed from the backwash clarifier using sludge pumps to pump backwashed solids to a sludge thickener before blending and further treatment and removal to a landfill.

24. The process of claim 1 wherein step (E) further comprises dosing a carbon filter used in the tertiary treatment with sodium hypochlorite or an equivalent to disinfect the filters and remove bacterial growth, thereby minimizing the risk that bacteria could attach and grow on the carbon filter.

25. The process of claim 24 further comprising the step of providing sodium hypochlorite tanks, feed pumps, and a supply pipe that dilutes and distributes a solution of sodium hypochlorite to a backwash header in one or more of the carbon pressure filter vessels.

26. A process for treating influent wastewater from a sewer system consisting essentially of the steps of:
(A) removing solids contained in the influent to create a solids-depleted preliminary effluent (PrE) and to protect downstream systems from premature failure due to wear from solid particles;
(B) removing suspended solids from the PrE to produce a suspended solids-depleted primary effluent (PE);
(C) treating the PE biologically by exposing it to bacteria-supporting media in a trickling filter that remove soluble organic material, thereby creating a trickling filter effluent (TFE);
(D) allowing suspended bacteria in the TFE to settle to create a secondary effluent (SE); and
(E) subjecting the SE to tertiary treatment including granular activated carbon pressure filters to remove PCB's and other compounds to create a carbon filter effluent (CFE),
so that sand filtration prior to step (E) can be avoided and solids plus soluble organic materials can be removed in one step.

27. A process for treating influent wastewater from a sewer system consisting of the steps of:
(A) removing solids contained in the influent to create a solids-depleted preliminary effluent (PrE) and to protect downstream systems from premature failure due to wear from solid particles;
(B) removing suspended solids from the PrE to produce a suspended solids-depleted primary effluent (PE);

(C) treating the PE biologically by exposing it to bacteria-supporting media in a trickling filter that remove soluble organic material, thereby creating a trickling filter effluent (TFE);
(D) allowing suspended bacteria in the TFE to settle to create a secondary effluent (SE); and
(E) subjecting the SE to tertiary treatment including granular activated carbon pressure filters to remove PCB's and other compounds to create a carbon filter effluent (CFE), so that sand filtration prior to step (E) is avoided and solids plus soluble organic materials can be removed in one step.

28. The process of claim 2 wherein step (F) comprises:

exposing a carbon filter effluent to ultraviolet light to alter the reproductive capacity of pathogenic organisms so that they can no longer be harmful or cause disease.

* * * * *